June 28, 1966 W. W. COUSINS 3,258,337

METHOD FOR PRODUCING MULTI-COLORED ARTWORK TO BE USED FOR PROOFING

Filed Nov. 6, 1961 2 Sheets-Sheet 1

Inventor

WILLIAM W. COUSINS by: Cavanagh & Norman

Inventor
WILLIAM W. COUSINS
by: Cavanagh & Norman

United States Patent Office 3,258,337
Patented June 28, 1966

3,258,337

METHOD FOR PRODUCING MULTI-COLORED ART WORK TO BE USED FOR PROOFING

William Walter Cousins, 26 Thatcher Ave., Scarborough, Ontario, Canada

Filed Nov. 6, 1961, Ser. No. 150,537
10 Claims. (Cl. 96—35)

Figure 1:
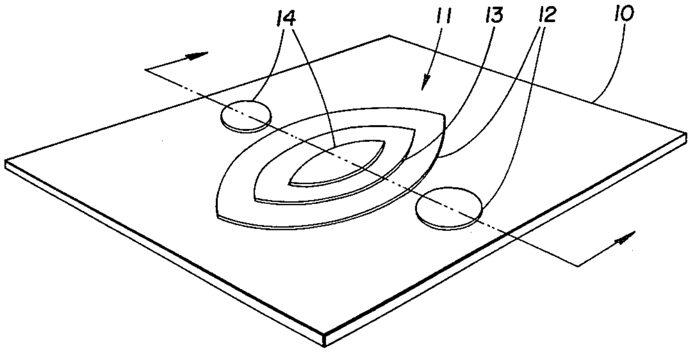

The invention relates generally to a photomechanical image and the method of producing the same and has particular reference to the use of printing inks in the formation of such an image in a plurality of colors.

A variety of photomechanical processes are known, some of which are used, for example, for the production of printing plates, which may thereafter be used in the printing of images in large quantities. Some of such processes involve the use of a photosensitive resist material which is subjected to a solvent development process to wash away certain areas while leaving the remainder, thus providing the image profile necessary for etching the printing plates. Clearly, such processes do not result in a finished reproduction but are merely utilized in the production of printing plates which may thereafter be used to produce finished prints in the usual way, and indeed in the case of a multi-color print a plurality of such plates will be required.

These processes are refrerred to generally by way of introduction herein as an indication of the uses of photosensitive resist materials in photomechanical processes.

The relevance of these processes to the scope of the present invention arises solely from the fact that resist materials are used at one stage, from which the term "photomechanical" is derived as being generic to the use of such materials.

The present invention, by contrast with the above-mentioned processes, is concerned essentially with the direct production of a finished image and is of prime interest in connection with the use of printing inks as the image medium, the greatest advantage being enjoyed in the case of a multi-color image using a number of different colored inks.

Image reproduction processes are known utilizing dyes as the color medium, but such processes are inherently limited in that such prior systems using organic-type dyes provide at best a poor substitute for inks made with pigments, and are generally speaking sensitive to variations in processing to produce widely different shades of coloring, printing inks by contrast being inherently stable and reliable in use under varying conditons, thus making possible the use of both transparent and opaque colors, more light-fast than dyes, and including colors nonexistent in dye form.

One of the various uses of the invention is in the production of color proofs of images prior to the making of the printing plates themselves, the production of which, by existing methods, is not entirely satisfactory when compared to the subsequent press reproduction, and act as guide for color balance, and a means of checking register, correctness of design and copy, etc. This invention makes possible, by the appropriate selection of colored media, a reproduction comparing closely with the press-run reproduction.

Accordingly, it is an object of the invention to provide a method of photomechanical reproduction resulting in the direct formation of a true image which is relatively simple and reliable to perform and is economical and expeditious in use.

More specifically it is an object of the invention to provide a method having the foregoing advantages which utilizes printing inks as the image medium. More specifically it is an object of the invention to provide a method having the foregoing advantages which results in a multi-colored image.

It is a further objective of the invention to provide a photo-mechanical image produced according to the aforesaid method.

The invention seeks to achieved the foregoing and other advantages which will become apparent from the following description of a preferred embodiment of the provisions of the method of forming a color image on a support comprising the steps of: forming a composite coating layer on a support, said layer including resoluble ink of the desired color and photosensitive resist material compatible therewith; at least partially drying said layer; exposing predetermined areas of said layer to sensitizing rays, said rays affecting the solubility of said resist material and defining areas of resoluble resist material and insoluble resist material corresponding to the profile of the image desired redissolving said composite layer in the areas corresponding to said areas of resoluble resist material while leaving said composite layer intact in the areas of insoluble resist material aforesaid.

Figure 6:
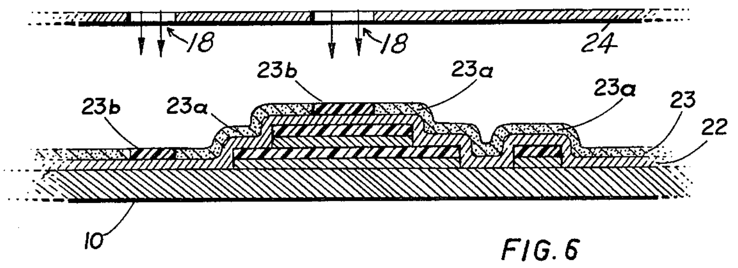
Figure 7:
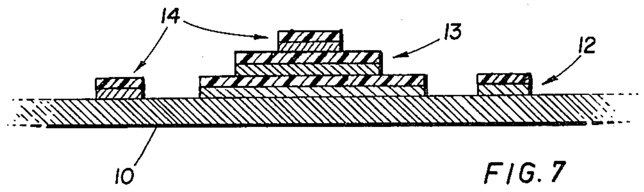
Figure 8:
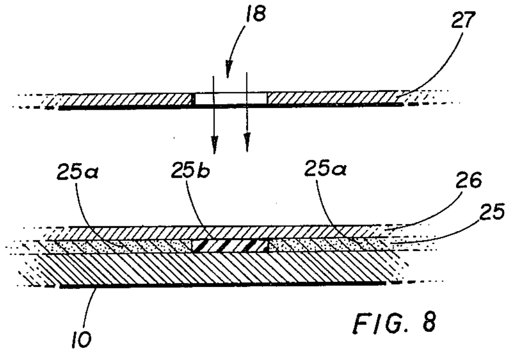
Figure 9:
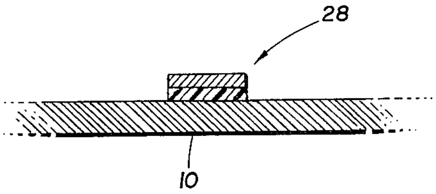

A preferred embodiment of the invention will now be described by way of example only with reference to the following drawings in which like reference devices refer to like parts thereof throughout the various views and diagrams and in which:

FIGURE 1 is an isometric view of an image formed according to the invention cut away to reveal its constituent layers, FIGURES 2, 3, 4, 5, 6 and 7 are diagrammatic sectional views of an image in the course of preparation showing successive stages of the operation, FIGURES 8 and 9 are diagrammatic sectional views of an image in the course of its preparation showing the successive stages of the operation according to an alternative mode of performing the same.

Before dealing with the method in detail it will be helpful to refer briefly to FIGURE 1 and indicate the nature of the finished image. Thus numeral 10 indicates any suitable support layer of paper, card, metal, plastic or the like on which the image 11 is formed. The image 11 itself is composed of composite layer 12, 13 and 14 embodying printing ink and resist material either as a mixture or in overlying films (see FIGURES 2 to 9), the inks in respective layers 12, 13 and 14 being of different colors and resulting in a three-color image. Clearly the layers 12, 13 and 14 will be in practice of imperceptible thickness in relation to the size of the image, being shown here in grossly exaggerated thickness by way of explanation.

Each said layer 12, 13 and 14 is applied separately according to the invention, each color of ink requiring repetition of the steps of the process to deposit successive layers of ink and resist one over the other until the image is complete. The number of times the process is repeated is therefore dependent upon the number of colors required in the finished image there being otherwise no limit within reason to the number of colors that can be employed.

The order in which such colors are applied will be dependent upon the skill and experience of the printer based upon a study of the drawing or other reproduction of the image it is desired to reproduce and a comparison of the color separation negatives produced therefrom. Such color separation negatives are, of course, the same as those which are used in other known photomechanical processes and are not thought to require further discussion beyond observing that there will be one such negative for each color in the finished image.

Figure 2:
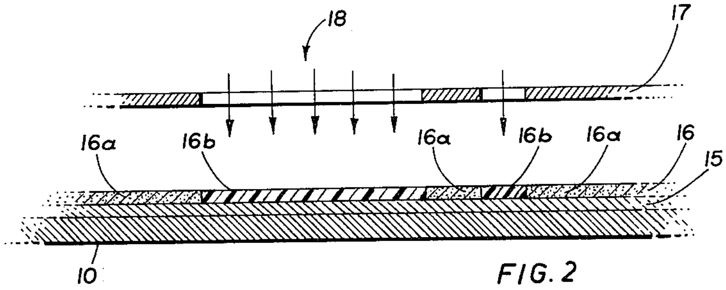
Figure 3:
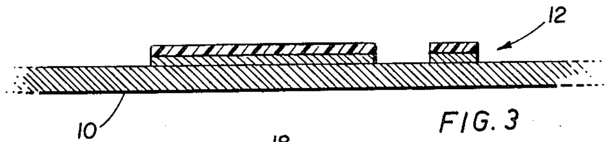
Figure 4:
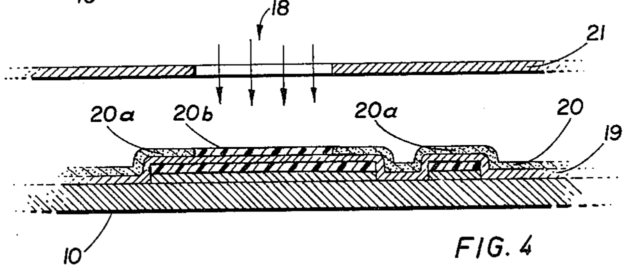
Figure 5:
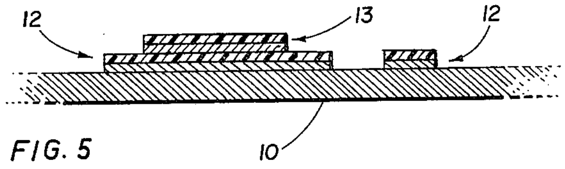

Referring now to FIGURES 2 to 7 it will be understoood that these figures represent the basic steps required to produce the image of FIGURE 1 according to one preferred mode of performing the invention, the thickness of the various layers being, of course, grossly exaggerated for the sake of clarity. FIGURES 2 and 3 represent the steps required to produce layer 12, FIGURES 4 and 5 represent the steps required to produce layer 13, and FIGURES 6 and 7 represent the steps required to produce the layer 14.

As stated above each of layers 12, 13 and 14 is made up of ink and resist material and in the method illustrated in FIGURES 2 to 7 such ink and resist material are applied separately as will be described below.

Thus in order to apply layer 12 to support 10, a film of resoluble ink 15 is applied to support 10 over substantially the whole of its surface by any suitable means, and is permitted to dry. A film of resoluble resist material 16 is then applied over the entire surface of ink film 15 and is again permitted to dry. The appropriate color separation negative 17 is then placed over the resist film 16 masking some areas **16*a* and exposing other areas 16*b*. Resist film 16 is then subjected to sensitizing rays 18 from any suitable source, such as an actinic light source (not shown) which strike the exposed areas of film 16 while being masked from the remainder. The resist film 16 in the exposed areas 16*b* is thus hardened and rendered insoluble while the masked areas 16*a* remain resoluble. Negative 17 is then removed and resist film 16 is subjected to a washing step in any suitable solvent which dissolves the film 16 in areas 16*a* while leaving the film 16 in areas 16*b* untouched. The removal of areas 16*a* of film 16 in this way uncovers corresponding areas of ink film 15 and these areas are then removed by a further washing step in any suitable solvent which dissolves ink film 15 in the uncovered areas while leaving film 15 untouched in the areas coated by resist film 16*b*. It will be appreciated that the ink film 15 located beneath resist film 16*b* is still in a resoluble state and accordingly some care may be necessary to avoid "leaching" of the edges of ink film 15** during this washing step.

FIGURE 3 corresponds to the state of image 11 at this stage in the process and it is then ready for the application of a further film 19 of ink of a different color and a further film 20 of resist material in the same way as described above. A further negative 21 is then used to mask areas **20*a* of resist film 20 and area 20*b* thereof is exposed to actinic light 18 and hardened. The two subsequent washing steps then remove surplus areas of resist film 20 and ink layer 19 and the resultant image will correspond substantially to FIGURE 5. The process is then repeated once more for ink film 22 and resist film 23, negative 24 masking areas 23*a* thereof and exposing areas 23*b*** to become hardened, as before. After washing the resultant image will correspond substantially to FIGURE 7.

It will be appreciated that while the process is only illustrated for use with three colors, further colors may be added in the same way as described above, the description of such further steps having been omitted for the sake of clarity.

No mention has been made at this stage of the actual materials used in this process and no attempt will be made to list such materials exhaustively. In general it may be stated that both the ink and the resist material should be compatible with one another and readily resoluble in different solvents so that the washing steps may be carried out selectively with a maximum of control at all time. However, in some cases it may be permissible to utilize ink and resist material which are soluble in the same solvent. Furthermore, the resist material should be transparent to render the ink visible therethrough without distortion of its coloring.

Additional refinements may be made to the process as generally described above. Thus the support layer 10 may be precoated with a protective lacquer to prevent absorbtion of the ink and resist material by the surface thereof, and to facilitate the washing steps without danger of damaging the said support. The surplus lacquer around the finished image may be subsequently redissolved and washed off, if desired, where for example it has become stained by the inks. Furthermore, it may in some cases be desirable to key the surface of the dried ink film, as by lightly rubbing the same with talc, prior to the application of the resist layer.

By way of further illustration of this particular embodiment of the invention an example will be given of the working of the invention in practice.

*Example 1*

A support layer of plain white paper was precoated with a film of synthetic resin lacquer, Saran F–220, Dow Chemical Company, consisting basically of a vinylidene chloride-acrylonitrile copolymer dissolved in an acetone solvent. The acetone was evaporated leaving a dry lacquer coating on the paper. The lacquer coating was then coated with a film of flexographic co-solvent ink, generally described as "polyamide-type ink," containing a film-former, pigment and/or dyes, and solvent, the specific ink in this case being "Aulflex" brand flexographic ink manufactured by Ault & Wiborg Inc., containing a polyamide type resin dissolved in a mixture of solvents formed of isopropyl alcohol and lactol spirits. The solvent was then evaporated leaving a dry ink coating on the lacquer. The ink coating was then coated with a film of photo-sensitive resist material such as a water soluble, negative-working diazonium compound, such as para diazo diphenylamine sulphate condensation product, and a suitable water-miscible colloid, in aqueous solution, and this film was then dried. The dry resist coating was then exposed to actinic light through a photographic negative so that the light formed an image in the resist which was thereafter insoluble in water. The remaining areas of resoluble resist were washed away with water and the surface was then dried once more. A mixture of the aforesaid ink solvents was then used to remove the ink in the areas not covered by resist. Subsequently, the lacquer coating exposed by the removal of the ink was itself removed with acetone. The foregoing steps were then repeated for each remaining color of ink until the image was completed.

Obviously, variations in the above procedures may be practiced without departing from the concept of the invention.

Thus, for example, the resist and the ink may be applied separately and redissolved together in some cases, or the ink may incorporate its own resist material. An example of this latter method of working the invention is as follows:

*Example 2*

As in Example 1 a support layer of plain white paper is precoated with a film of synthetic resin lacquer using an acetone solvent. The evaporation of the solvent leaves a thin dry lacquer coat on the paper. Next, a prepared ink having a suitable admixture of resist material such as a diazonium compound soluble at least to an extent of one percent by weight in the same type of solvent used in the ink is then applied over the dry lacquer coat and allowed to dry by evaporation of the solvent. An ink, suitable for this process, could consist of a resin such as polyvinyl resins or cellulose derivatives, e.g., a nitrocellulose flexographic ink, in a suitable solvent such as aliphatic ketone or alcohol with a resist such as a diazo oxide. The dry ink with the resist is then exposed to actinic light through the photographic negative whereby the resist so affected is insoluble in the solvent used above. The remaining areas of the ink and resist are then washed with solvent leaving the exposed image. After drying the lacquer remaining is then removed from the paper with a suitable solvent. The foregoing steps are then repeated for each color to be applied until a complete image is formed.

Clearly such a substance does not come within a strict definition of "printing ink" as generally understood in the trade but for the purposes of the invention such substances are included in the general meaning of the word ink. Thus, the inks used according to the invention can include inks containing pigments, which may be insoluble inorganic colored compounds, or organic dyes precipitated on an inert base such as barium sulphate or alumina hydrate. The advantages of this form of the invention lie principally in the realm of economy in time, both in the application of the film of liquid, and in the redissolving of the surplus portions of the dried layer, though other advantages will be apparent in particular cases.

A further variation of the invention which may be practiced under certain circumstances is to reverse the order of application of the ink and resist films, where these are applied separately. According to this form of the invention the resist film is applied first and dried and exposed to sensitizing rays through a pattern, after which the ink is applied over the exposed but undeveloped resist layer. Development consists of an application of water or steam, which permeates the ink film and dissolves the still-soluble resist material, which is removed along with the ink overlying it, by suitable means. The areas of insoluble resist, with its overlying ink layer, are unaffected and remain. In this process it is desirable to use an ink having a minimum of film-former in its composition thus permitting the resist solvent to penetrate the ink layer with the maximum of effect.

FIGURES 8 and 9 indicate the steps of this form of the invention corresponding to the steps illustrated by FIGURES 2 and 3 in respect of the form of the invention described heretofore. In FIGURES 8 and 9 the support layer 10 is coated with a film 25 of resist material. The resist coating is exposed to sensitize rays 18 through negative 24, thus hardening area **25*b* of resist 25 and ink layer 26 is then applied and permitted to dry. The subsequent single developing step is made with a suitable resist solvent which penetrates ink layer 26 and redissolves the resist in the areas 25*a* which have been masked from rays 18 thus carrying with it the ink 26 overlying the same. FIGURE 9 represents the resultant image 27** over which the same steps may be repeated to deposit further layers of ink and resist as desired. This form of the invention has the advantage of allowing the ink to be removed in the nonimage areas without actually redissolving it, thus avoiding the inherent danger of undercutting the edges of the ink image.

Other variations include the use of resist materials which when initially applied and dried are insoluble and are subsequently rendered soluble by exposure to sensitizing rays. When using this type of resist it will of course be necessary to use the opposite type of masking, namely a photographic positive transparency, since it will be necessary to mask the areas which will form part of the finished image.

Under some circumstances, such as an automatic or mechanized form of operation it may be desirable to use a high-speed resist material and for these purposes resist materials formed of polyvinyl cinnamate sensitized with 2-keto-3 methyl-1, 3-diazabenzanthrone, as disclosed by Minsk et al., U.S. Patent No. 2,670,285, February 23, 1954, may be found to be suitable. In many cases however a generally suitable resist material, at least for manual reproduction as described, is that manufactured and sold by the Direct Reproduction Corporation, of Brooklyn, N.Y., under the trade name "Watercote Extender." The composition of such material is described in United States Letters Patent No. 2,716,061, John M. Lupo, dated August 23, 1955, with the exception that the material "Watercote Extender" does not contain pigments or dyes as described, and the ammonium dichromate may be replaced with a diazo compound such as paradiazodiphenylamine sulphate in which case the ammonium hydroxide can be eliminated.

A further variation which may sometimes be of utility is an additional transfer step by which the finished image is transferred from a temporary support to a permanent support. This may be desirable where the permanent support is of an absorbent nature, for example, rendering it unsuitable for use in the practice of the various steps of the invention.

It will be seen that the practice of the invention will result in a high quality color reproduction having superior image resolution and sharpness and in which the ink films forming the image are continuous, as compared with the split film of ink produced in a printing process, and the invention is therefore of utility in many fields including the field of color printing. Costs of the process may be kept down where this is a factor, by for example recovering the redissolved ink and resist for reuse in the process, and other economies will suggest themselves to those skilled in the art.

The process has found a useful application amongst other uses in the field of commercial art, as a substitute for the artist's comprehensive sketch. The artist prepares a "visual" or rough sketch of his design, and from this he prepares a black-and-white reproduction drawing. This drawing is photographed and a negative made for each color. From the negative the color reproductions are prepared according to the invention.

An advantage of this procedure is that multiple copies can be produced more economically than either an artist can prepare them, or than by a printing process such as letterpress, where printing plates would have to be made. Another advantage is the ability to produce a number of reproductions of the same design in different color combinations. The client can more easily visualize the design from these reproductions because they have a very close appearance to the final printed design.

The foregoing is a description of a preferred embodiment of the invention and is here made by way of example only. It is not intended to thereby limit the scope of the invention to any of the specific steps described and the invention comprehends all such variations as come within the spirit and scope of the claims herein.

What I claim is:

1. The method of forming multi-color artwork for use in proofing the same prior to production of printing plates and comprising the steps of: forming a composite coating layer on a support, said layer including resoluble ink of a first color and photosensitive resist material compatible therewith; at least partially drying said layer; exposing predetermined areas of said layer corresponding to areas of said first color in said image to sensitizing rays, said rays affecting the solubility of said resist material and defining areas of resoluble resist material and insoluble resist material corresponding to the profile of the predetermined areas of said first color aforesaid; redissolving said composite layer in the areas corresponding to said areas of resoluble resist material while leaving said composite layer intact in the areas of insoluble resist material aforesaid, forming a second composite layer, said layer including a resoluble ink of a second color of said image and photosensitive resist material compatible therewith; at least partially drying said second layer; exposing predetermined areas of said second layer corresponding to areas of said second color in said image and defining areas of resoluble resist material and insoluble resist material corresponding to the profile of predetermined area of said second color aforesaid, and redissolving said composite layer in the areas of resoluble resist material while leaving said composite layer intact in the areas of insoluble resist material.

2. The method as claimed in claim 1 wherein said composite layer is formed by the steps of initially applying a film of said ink to said support, at least partially drying the same, and subsequently applying a film of said resist material thereto, and at least partially drying the same.

3. The method as claimed in claim 1 wherein said composite layer is formed by the steps of initially forming a mixture of said ink and said resist material, applying a film of said mixture to said support layer, and at least partially drying the same.

4. The method as claimed in claim 1 wherein said composite layer is formed by the steps of initially applying a film of said resist material to said support, at least partially drying the same, subsequently applying a film of said ink thereto, and at least partially drying the same.

5. The method as claimed in claim 1 including subsequently repeating the said steps utilizing inks of further colors corresponding to further colors in said image.

6. The method as claimed in claim 1 wherein said rays are actinic light rays and wherein said resist material is sensitive thereto to change from a resoluble state to a substantially insoluble state.

7. The method as claimed in claim 1 including the steps of initially redissolving said resist material in areas of resoluble resist material and subsequently redissolving said ink in the same said areas.

8. The method as claimed in claim 1 including the steps of precoating said support with a film of laquer or the like and at least partially drying the same.

9. The method as claimed in claim 1 wherein said composite layer is formed by the steps of initially applying a film of said ink to said support, at least partially drying the same, lightly treating the surface of said dried ink film with talc, subsequently applying a film of said resist material thereto, and at least partially drying the same.

10. The method as claimed in claim 1, wherein said resist material is insoluble when dried and is sensitive to said rays to become resoluble in areas exposed thereto.

References Cited by the Examiner

UNITED STATES PATENTS

| | | | |
|---|---|---|---|
| 654,766 | 7/1900 | Selle | 96—13 |
| 1,574,156 | 2/1926 | Kiesling | 96—13 |
| 2,080,965 | 5/1937 | Funck | 96—35 |
| 2,381,234 | 8/1945 | Symmes | 96—13 |
| 2,446,915 | 8/1948 | Filmer | 96—35 |
| 2,544,903 | 3/1951 | Staehler | 96—35 |
| 2,653,871 | 9/1953 | Marsh | 96—35 |

FOREIGN PATENTS

| | | |
|---|---|---|
| 9,184 | 3/1903 | Great Britain. |
| 483,776 | 4/1938 | Great Britain. |

OTHER REFERENCES

Henley: The Metal Industry, June 18, 1943, pp. 386–388.

J. TRAVIS BROWN, *Acting Primary Examiner.*

NORMAN G. TORCHIN, *Examiner.*

A. D. RICCI, *Assistant Examiner.*